United States Patent
Clark et al.

(10) Patent No.: US 7,056,846 B2
(45) Date of Patent: Jun. 6, 2006

(54) REPELLENT FLUOROCHEMICAL COMPOSITIONS

(75) Inventors: John C. Clark, White Bear Lake, MN (US); Malcolm B. Burleigh, St. Paul, MN (US); Chetan P. Jariwala, Woodbury, MN (US); Qiu Zai-Ming, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 549 days.

(21) Appl. No.: 10/004,847

(22) Filed: Dec. 4, 2001

(65) Prior Publication Data

US 2003/0136938 A1    Jul. 24, 2003

(51) Int. Cl.
*B32B 29/02* (2006.01)
*B32B 27/40* (2006.01)
*C08G 18/28* (2006.01)

(52) U.S. Cl. .................... 442/94; 442/93; 106/287.27; 106/287.28; 106/287.3; 106/287.32; 528/70; 528/391; 560/157; 560/351; 564/80

(58) Field of Classification Search ................ 528/70, 528/391; 442/93, 94; 560/157, 351; 564/80; 106/287.27, 287.28, 287.3, 287.32
See application file for complete search history.

(56) References Cited

U.S. PATENT DOCUMENTS

| | | |
|---|---|---|
| 3,398,182 A | 8/1968 | Guenthner et al. |
| 3,896,251 A | 7/1975 | Landucci |
| 3,916,053 A | 10/1975 | Sherman et al. |
| 4,001,309 A | 1/1977 | Hayashi et al. |
| 4,264,484 A | 4/1981 | Patel |
| 4,504,401 A | 3/1985 | Matsuo et al. |
| 4,540,497 A | 9/1985 | Chang et al. |
| 4,606,737 A | 8/1986 | Stern |
| 4,668,406 A | 5/1987 | Chang |
| 4,788,287 A | 11/1988 | Matsuo et al. |
| 4,792,354 A | 12/1988 | Matsuo et al. |
| 4,822,373 A | 4/1989 | Olson et al. |
| 4,853,418 A | 8/1989 | Hanada et al. |
| 4,875,901 A | 10/1989 | Payet et al. |
| 4,937,123 A | 6/1990 | Chang et al. |
| 5,025,052 A | 6/1991 | Crater et al. |
| 5,098,774 A | 3/1992 | Chang |
| 5,212,272 A | 5/1993 | Sargent et al. |
| 5,223,340 A | 6/1993 | Moss, III et al. |
| 5,310,828 A | 5/1994 | Williams |
| 5,316,850 A | 5/1994 | Sargent et al. |
| 5,350,795 A | 9/1994 | Smith et al. |
| 5,410,073 A | 4/1995 | Kirchner |
| 5,411,766 A | 5/1995 | Kirchner |
| 5,414,111 A | 5/1995 | Kirchner |
| 5,484,818 A * | 1/1996 | De Vos et al. ............... 521/123 |
| 5,520,962 A | 5/1996 | Jones, Jr. |
| 5,565,564 A | 10/1996 | Kirchner |
| 5,672,651 A | 9/1997 | Smith |
| 5,688,884 A | 11/1997 | Baker et al. |
| 5,714,082 A * | 2/1998 | Boardman et al. ......... 252/8.62 |
| 5,990,212 A | 11/1999 | Hager et al. |
| 6,197,378 B1 | 3/2001 | Clark et al. |
| 6,525,127 B1 * | 2/2003 | Jariwala et al. ............. 524/462 |
| 2003/0026997 A1 * | 2/2003 | Qiu et al. ................ 428/423.1 |

FOREIGN PATENT DOCUMENTS

| | | |
|---|---|---|
| GB | 1011976 | 12/1965 |
| WO | WO 97/14842 | 4/1997 |
| WO | WO 98/44015 | 10/1998 |
| WO | WO 01/10922 A1 | 2/2001 |

OTHER PUBLICATIONS

"Waterproofing and Water/Oil Repellency", Kirk-Othmer Encyclopedia Of Chemical Technology, pp. 442-465, vol. 24, 3rd Ed.

Edited by R. E. Banks, "Industrial Aspects of Fluorine Chemistry", Organofluorine Chemicals and Their Industrial Applications, 1979, p. 56, Ellis Horwood Ltd.

James O. Hendricks, "Industrial Fluorochemicals", Industrial and Engineering Chemistry, (Jan. 1953), pp. 99-105, vol. 45, No. 1.

M. K. Bernett and W. A. Zisman, "Wetting Of Low-Energy Solids By Aqueous Solutions Of Highly Fluorinated Acids And Salts", The Journal of Physical Chemistry, (1959), pp. 1911-1916, vol. 63.

Neal O. Brace, "Long Chain Alkanoic and Alkenoic Acids with Perfluoroalkyl Terminal Segments" The Journal of Organic Chemistry, (Dec. 1962), pp. 4491-4498, vol. 27.

William A. Zisman, "Contact Angle, Wettability, and Adhesion", Advances in Chemistry Series No. 43, 1963, pp. 1-51.

Edited by R. E. Banks, "Electrochemical Fluorination (Simons Process)", Preparation, Properties, and Industrial Applications of Organofluorine Compounds, 1982, p. 26, Ellis Horwood Ltd.

Douglas A. Wicks and Zeno W. Wicks Jr., "Blocked Isocyanates III.: Part. A. Mechanisms And Chemistry", Progress In Organic Coatings, (Jul. 1999), pp. 148-172, vol. 36, No. 3.

* cited by examiner

Primary Examiner—Jeffrey B. Robertson
(74) Attorney, Agent, or Firm—Kent S. Kokko (57) ABSTRACT

This invention provides compositions and methods for treating fibrous substrates to render those substrates durably repellent to water and oil and durably resistant to dry soil comprising a fluorochemical urethane formed by reacting a tri- or higher order isocyanate with a fluorochemical monofunctional compound; and optionally a non-fluorinated aliphatic monofunctional compound.

16 Claims, 3 Drawing Sheets

FIG. 3
♦ non sulfonamido
□ sulfonamido

to the fibrous substrate. U.S. Pat. No. 5,414,111 teaches specifically the use of a monofunctional, non-fluorinated organic compound as an optional reactive component.

U.S. Pat. No. 4,504,401 (Matsuo et al.) describes a stainproofing agent represented by the general formula ($R_f$—X-A-CONH)$_a$W(NHCO-A'-Z)$_{3-a}$, wherein $R_f$ is a polyfluoroalkyl group having from 1 to 20 carbon atoms. X is —R—, —CON($R^1$)-Q- or —SO$_2$N($R^1$)-Q-(where R is a divalent alkylene group, $R^1$ is a hydrogen atom or lower alkyl group and Q is a divalent organic group), each or A and A' is —O—, —S—, or —N(Z')— (where Z' is a hydrogen atom or a monovalent organic group), Z is a monovalent organic group, W is a trivalent organic group and a is an integer of 1,2 or 3.

REPELLENT FLUOROCHEMICAL COMPOSITIONS

FIELD OF THE INVENTION

This invention relates to the treatment of fibrous materials, particularly carpets, with fluorochemical compositions to impart durable water and oil repellency and dry soil resistance thereto.

BACKGROUND OF THE INVENTION

The treatment of various fibrous substrates, notably carpets, textiles, leathers and papers, with fluoroaliphatic group-containing polymers and oligomers enabling them to retain their original aesthetic appeal (e.g., to render them repellent to water- and oil-based stains and resistant to soils) has been known in the art for many years. Mason Hayek, Waterproofing and Water/Oil Repellency, in 24 KIRK-OTHMER ENCYCLOPEDIA OF CHEMICAL TECHNOLOGY 448–65 (3d ed. 1979), for example, provides a general overview of anti-staining and anti-soiling technology for fibrous substrates.

Fluorochemicals known to be useful for treating carpets include ester oligomers, as disclosed in U.S. Pat. No. 4,264,484 (Patel), carbodiimide oligomers, as disclosed in U.S. Pat. No. 3,896,251 (Landucci), guanidine oligomers, as disclosed in U.S. Pat. No. 4,540,497 (Chang), allophanate oligomers, as disclosed in U.S. Pat. No. 4,606,737 (Stem), oxazolidinone oligomers, as disclosed in U.S. Pat. No.5,025,052 (Crater et al.), and acrylic polymers, as disclosed in U.S. Pat. No. 3,916,053 (Sherman et al.).

Fluorochemical urethane, urea, and biuret oligomers have often become the treatment of choice for carpets due to their durable soil-resistance properties. For example, U.S. Pat. No. 3,398,182 (Guenthner et al.) discloses the use of fluoroaliphatic urethanes in making oleophobic and hydrophobic coatings that resist removal by abrasion.

U.S. Pat. No. 5,350,795 (Smith et al.) discloses substantially organic solvent-free, aqueous solutions or dispersions for treating textile fibers and fabrics to impart oil and water repellency without thermal treatment comprising (a) a fluorochemical acrylate copolymer comprising the reaction product of a fluorinated acrylate monomer, polyoxyalkylene glycol acrylate or methacrylate, and polyoxyalkylene glycol diacrylate or dimethacrylate, and (b) a polyalkoxylated polyurethane having pendant perfluoroalkyl groups comprised of an aliphatic or aromatic tri- or higher order isocyanate, a fluorinated alcohol, amine or mercaptan, and a poly(oxyalkylene) diol or dithiol, the polyurethane having a weight average molecular weight of over 40,000.

U.S. Pat. Nos. 5,410,073 (Kirchner), 5,411,766 (Kirchner) and 5,414,111 (Kirchner) each describes polyfluoro nitrogen containing organic compounds made by reacting (a) at least one polyisocyanate or mixture of polyisocyanates that contain at least three isocyanate groups per molecule with (b) at least one fluorochemical compound which contains per molecule (i) a single functional group having one or more Zerewitinoff hydrogen atoms and (ii) at least two carbon atoms each of which contains at least two fluorine atoms, the amount of fluorochemical compound being sufficient to react with 95% to 40% of the isocyanate groups, (c) then reacting the reaction product of (a) and (b) with water in an amount to react with the about 5% to about 50% of remaining isocyanate groups; such compounds when applied to fibers and fabrics reportedly provide durable water-, oil- and soil-repellent and/or soil release properties

SUMMARY OF THE INVENTION

The inventors recognized the need for shelf-stable chemical compositions, including those containing fluorine that can successfully impart long-term durability, uniform oil- and water-repellency and soil- and stain-resistance. These chemical compositions should be water and organic solvent soluble or dispersible and preferably not require high temperatures for curing.

Briefly, in one aspect, this invention provides compositions for treating fibrous substrates to render those substrates durably repellent to water and oil and durably resistant to dry soil comprising a fluorochemical urethane formed by: (a) reacting a tri- or higher order polyisocyanate with a reactive $C_3$–$C_6$ fluorochemical monofunctional compound, in sufficient amounts to react with at least 50%, preferably at least 75%, of the available isocyanate groups. Optionally, an aliphatic monofunctional compound may be present in amounts to react with up to 20% of the isocyanate groups present in the product compound. Optionally, any remaining isocyanate groups may be blocked isocyanate groups.

In another aspect, the present invention provides a method of treating fibrous substrates to render those substrates durably repellent to water and oil and durably resistant to dry soil comprising application of the aforementioned composition to a fibrous substrate and optionally one or more anti-staining compounds (also known as stainblockers) such as acrylic and methacrylic acid polymers and copolymers, sulfonated phenol-formaldehyde resins, and styrene-maleic anhydride polymers and copolymers, said application of the composition taking place either coincident with or following application of the fluorochemical urethane compound or compounds to the substrate.

In yet another aspect, the present invention provides fibrous substrates treated with these compositions imparting to those substrates appearance-retention properties such as durable dynamic and static repellency, stain release, and soil repellency.

Unexpectedly, it has been found that the fluorochemical urethane compounds of the present invention, having $C_3$–$C_6$ fluoroalkyl radicals, provide repellency and/or antisoiling properties comparable to those provided by higher fluoroalkyl radicals. Heretofore it has been believed that perfluorolkyl groups having at least 8 carbon atoms were necessary for adequate performance, and the performance of lower perfluoroalkl groups degraded with decreasing carbon number. Further, it has been found that only those fluorochemical monofunctional compounds having a —SO$_2$N($R^1$)—$R^2$— linking group (as herein defined) maintained adequate performance with decreasing carbon chain, while the performance of those with other linking groups, e.g. —$C_nH_{2n+1}$—, did degrade as expected.

Fluorochemical compositions have achieved widespread use in a variety of applications, including, for example, in oil- and/or water-repellent compositions, and in surfactant compositions. Some known fluorochemical compositions ultimately degrade to perfluorooctyl-containing compounds when exposed to biological, thermal, oxidative, hydrolytic and photolytic conditions found in the environment. It has been reported that certain perfluorooctyl-containing compounds ($C_8F_{17}$—) may tend to bio-accumulate in living organisms; this tendency has been cited as a potential concern regarding some fluorochemical compositions. For example, see U.S. Pat. No. 5,688,884 (Baker et al.). As a result, there is a desire for fluorine-containing compositions effective in providing desired functional properties, e.g., water- and oil- repellency, surfactant properties, etc. while eliminating more effectively from biological systems.

The performance of the present compositions are surprising in view of teachings that the lower perfluoroalkyl groups were significantly less effective than longer chain perfluoroalkyl groups, such as the perfluorooctyl group. For example, it has been demonstrated that surfactants derived from perfluorocarboxylic acids and perfluorosulfonic acids exhibit considerable differences in performance as a function of chain length. See, for example *Organofluorine Chemicals and their Industrial Applications,* edited by R. E. Banks, Ellis Horwood Ltd. (1979), p56; J. O. Hendrichs, *Ind. Eng Chem.,* 45, 1953, p103; M. K. Bernett and W. A. Zisman, *J. Phys. Chem.,* 63, 1959, p1912.

Further, various models have been devised to explain the low surface energies and resultant high contact angle data of fluorinated polymer coatings that are based on a monolayer of a fluorinated carboxylic or sulfonic acids present at the air/liquid interface. The data suggest that only after the seven outermost carbon atoms of the fluoroalkyl group ($C_7F_{15}$—) were fully fluorinated did the contact angles (and therefore the surface energies) of various liquids on the surface approach those of a perfluorinated acid monolayer (see N. O. Brace, *J. Org. Chem.,* 27 1962, p 4491 and W. A. Zisman, *Advan. Chem,* 1964, p 22.). Therefore, one would expect that the performance of fluorinated coatings containing fluoroalkyl groups (e.g., coatings made by polymerizing fluoroalkyl (meth)acrylates) could be predicted from the known performance of perfluorocarboxylic and perfluorosulfonic acid derivatives, and the surface energy of the fluoropolymer coatings would be related to the chain length of the fluoroalkyl group of the fluoropolymer coating.

Surprisingly, it has been found that the compositions comprising the fluoroalkylsulfonamido moieties, having fluoroalkyl groups of three to six carbon atoms, exhibit surface energies and contact angle performance which are comparable to textile treatments comprising longer chain fluoroalkyl homologues, such as those having perfluorooctyl groups.

The present treatment compositions provide additional advantages. First, the precursor compounds containing the shorter fluoroalkyl groups useful in the treatment compositions of the invention may be produced at a lower cost per weight because of higher yields while maintaining their potency as effective low surface energy coatings at the same weight basis. For example, the heptafluorobutyryl fluoride precursor may be prepared in yields of 60% as compared to perfluoro-octanoyl fluoride precursor (31%) in an electrochemical fluorination process (*Preparation, Properties, and Industrial Applications of Organofluorine Compounds,* edited by R. E. Banks, Ellis Horwood Ltd (1982), p 26).

Furthermore, the short chain carboxylic acids (the presumed intermediate degradation products) are less toxic and less bioaccumulative than the longer chain homologues.

Unless otherwise stated, the following terms used in the specification and claims have the meanings given below:

"Alkyl" means a saturated monovalent hydrocarbon radical having from one to about twelve carbon atoms, e.g., methyl, ethyl, 1-propyl, 2-propyl, pentyl, and the like.

"Alkylene" means a saturated divalent hydrocarbon radical having from one to about twelve carbon atoms, e.g., methylene, ethylene, propylene, 2-methylpropylene, pentylene, hexylene, and the like.

"Cured chemical composition" means that the chemical composition is dried or solvent has evaporated from the chemical composition at approximately ambient temperature (15–35° C.) or elevated temperature, until dryness, up to approximately 24 hours.

"Fibrous substrate" means materials comprised of synthetic fibers such as wovens, knits, nonwovens, carpets, and other textiles; and materials comprised of natural fibers such as cotton, paper, and leather.

"Fluorochemical monofunctional compound" means a compound having one reactive functional group, capable of reacting with an isocyanate group, and a fluoroalkyl or a fluoroheteralkyl group, e.g. $C_4F_9SO_2N(CH_3)CH_2CH_2OH$, $C_4F_9SO_2N(CH_3)CH_2CH_2NH_2$, $C_2F_5O(C_2F_4O)_3CF_2$ $SO_2N(H)C_2H_4SH$, and the like.

"Heteroalkyl" has essentially the meaning given above for alkyl or alkylene respectively except that one or more heteroatoms (i.e. oxygen, sulfur, and/or nitrogen) may be present in the alkyl chain, these heteroatoms being separated from each other by at least one carbon, e.g., $CH_3CH_2OCH_2CH_2$—, $CH_3CH_2OCH_2CH_2OCH(CH_3)CH_2$—, $C_4F_9CH_2CH_2SCH_2CH_2$—, —$CH_2OCH_2CH_2$—, and the like.

"Halo" means fluoro, chloro, bromo, or iodo, preferably fluoro and chloro.

"Long-chain monofunctional compound" means a compound having one isocyanate-reactive functional group and a long chain hydrocarbon group having 12 to 72 carbons which may be saturated, unsaturated, or aromatic, and may optionally be substituted with one or more chlorine, bromine, trifluoromethyl, or phenyl groups, e.g. $CH_3(CH_2)_{10}CH_2OH$, $CH_3(CH_2)_{14}CH_2NH_2$, and the like.

"Perfluoroalkyl" has essentially the meaning given above for "alkyl" except that all or essentially all of the hydrogen atoms of the alkyl radical are replaced by fluorine atoms and the number of carbon atoms is from 3 to about 6, e.g. perfluoropropyl, perfluorobutyl, perfluorohexyl, and the like.

"Perfluoroheteroalkyl" has essentially the meaning given above for "perfluoroalkyl" except one or more non-adjacent —$CF_2$— groups are replaced by an in-chain oxygen, sulfur or nitrogen.

"Perfluorinated group" means an organic group wherein all or essentially all of the carbon bonded hydrogen atoms are replaced with fluorine atoms, e.g. perfluoroalkyl, perfluoroheteroalkyl, and the like.

"Polyfunctional isocyanate compound" means a compound containing three or more isocyanate (—NCO), or blocked isocyanate radicals, attached to a multivalent aliphatic or cycloaliphatic organic group, e.g. hexamethylene diisocyanate, the biuret and isocyanurate of hexamethylene diisocyanate, and the like.

DETAILED DESCRIPTION OF THE INVENTION

Figure 1:
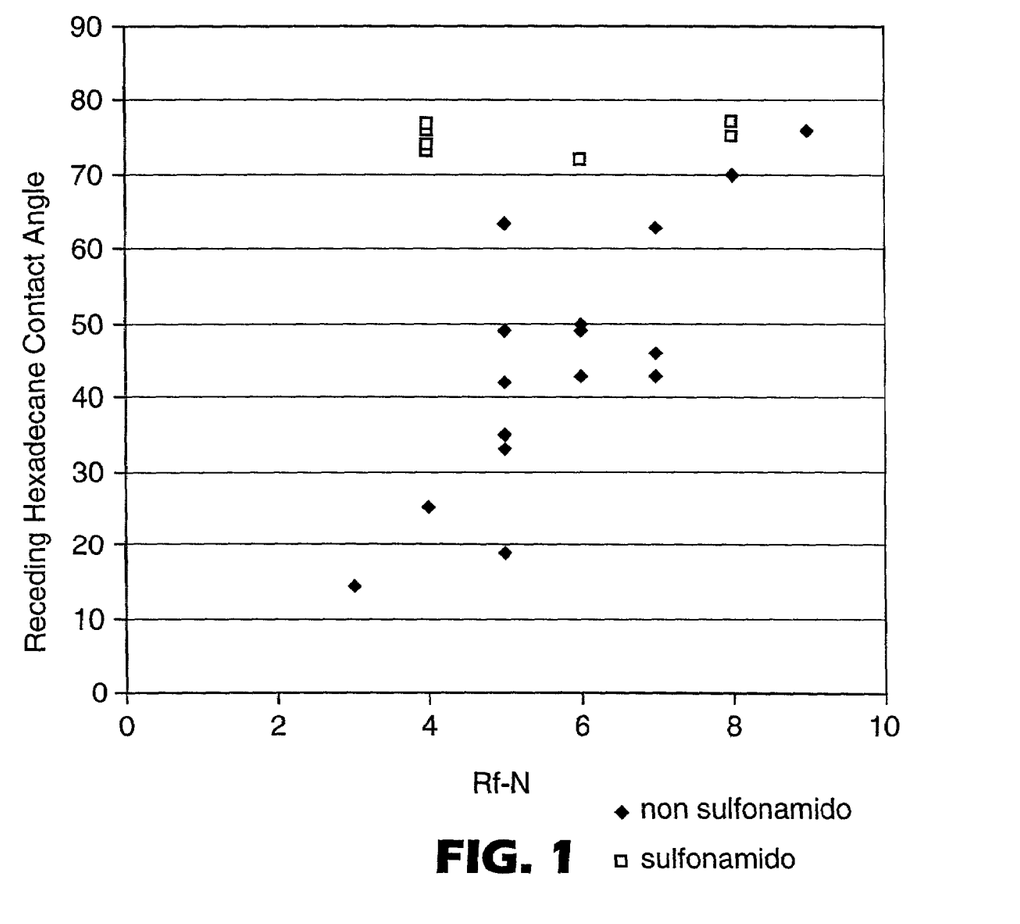
FIG. 1 is a plot of the receding hexadecane contact angle vs. the $R_f$ chain length of urethane.
Figure 2:
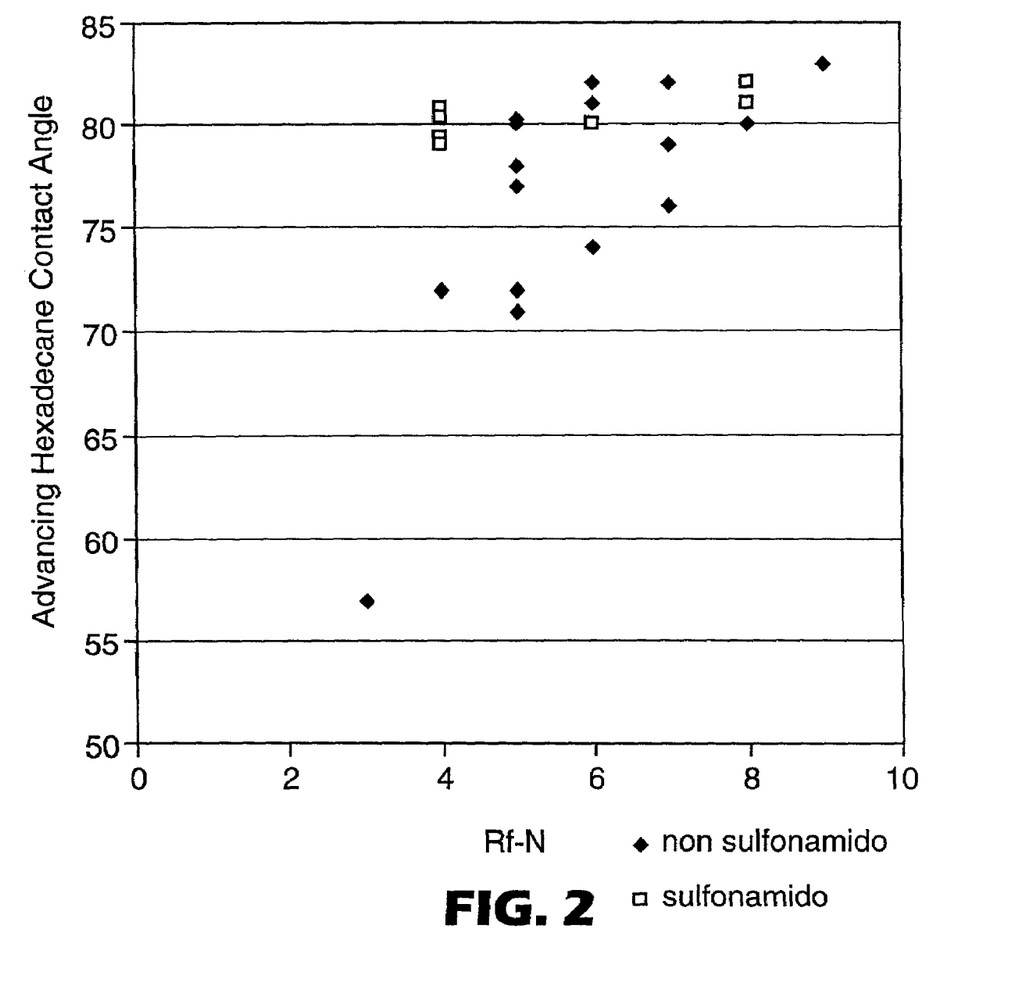
FIG. 2 is a plot of the advancing hexadecane contact angle vs. the $R_f$ chain length of the urethane.
Figure 3:
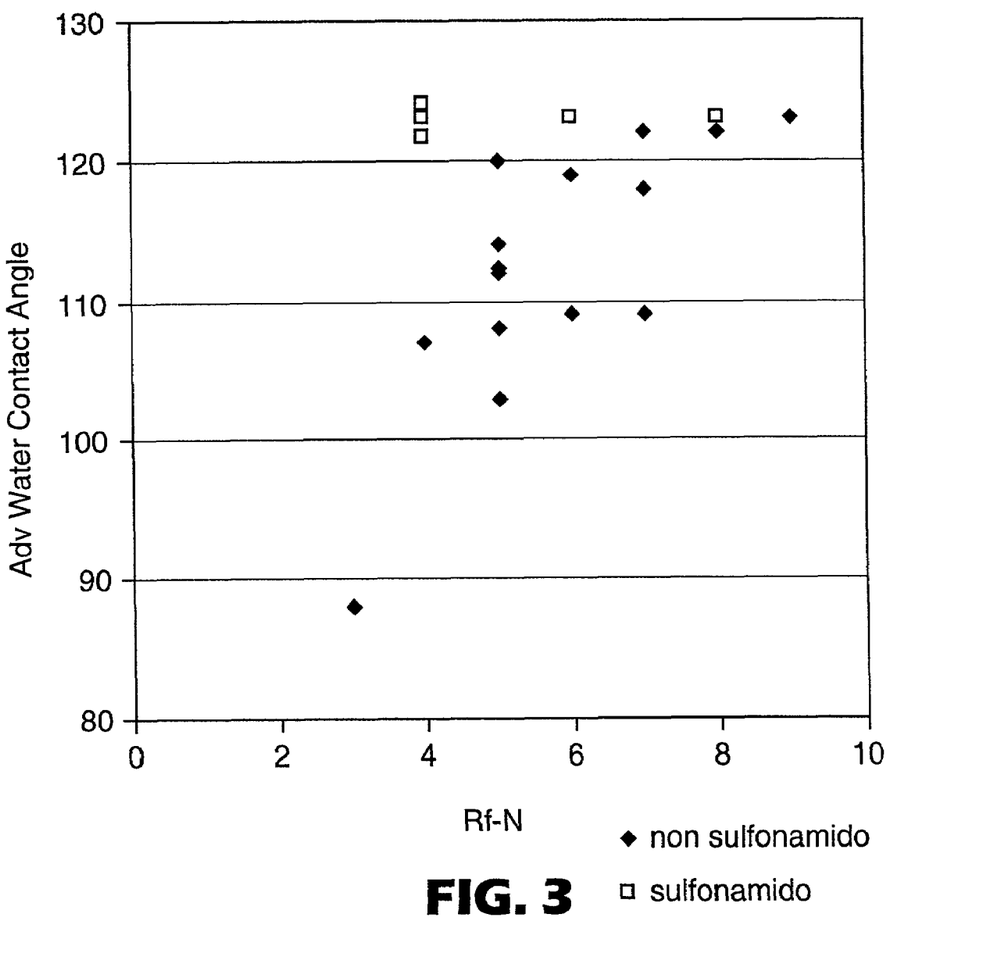
FIG. 3 is a plot of the advancing water contact angle vs. the $R_f$ chain length of the urethane.

The fluorochemical treatments of the present invention are fluorochemical, urethane compounds formed from the reaction of (1) a tri- or higher order isocyanate; (2) a stoichiometric amount of a reactive fluorochemical compound sufficient to react with at least 50% of the isocyanate (i.e., —NCO) groups; and (3) and optionally a stoichiometric amount of aliphatic monofunctional compound sufficient to react with 20% or less of the isocyanate groups.

These above-described reactants provide a mixture of fluorochemical urethane compounds that are soluble in an organic solvent or readily emulsifiable in water, that may provide a thermally stable aqueous emulsion, and that is suitable for application onto a substrate by a variety of methods.

The fluorochemical treatments of the invention find particular utility when applied onto a substrate that is also treated with one or more hydrophilic anti-staining compounds (sometimes generically referred to as "stainblockers") such as acrylic and methacrylic acid polymers and copolymers, sulfonated phenolformaldehyde resins, and styrene-maleic anhydride polymers and copolymers. Substrates, particularly carpets, that are so treated exhibit superior resistance to soiling and superior repellency to water and oil-borne stains.

Typically, the treatment compositions in accordance with this invention are emulsions, dispersions or solutions of from about 10 to about 30 weight percent of the above-described fluorochemical urethane compounds and, if present in the composition, collectively from 0 to about 10 weight percent of one or more stainblockers. Economic factors will compel the choice of aqueous emulsions in most circumstances, though other suitable solvents may also be used to create the emulsion with similar utility. The treatment composition may be further diluted as desired.

The treatment compositions are typically applied to the carpet at levels from 0.05 to 10 weight percent solids, preferably 0.1 to 3 weight percent solids, based on the weight of the fiber or fabric (known as solids-on-fiber or S.O.F). Nonionic, anionic, cationic or amphoteric surfactants may also be used as dispersants for the composition for the application. Substrates also treated with a stainblocker typically will contain between 0.05 and 3 weight percent of one or more of the stainblockers based on the weight of the fiber.

The fluorochemical urethane compounds of the invention may be formed by reacting (a) the tri- or higher order isocyanate with a reactive fluorochemical monofunctional compound, and (b) optionally with a limited amount of a aliphatic monofunctional compound. The reaction may be carried out in accordance with well-known techniques such as, for example, by condensation in a suitable solvent such as methyl isobutyl ketone (MIBK) using a small amount of a dibutyltin dilaurate catalyst. The urethane compound, formed in such a manner, may be emulsified in water or dissolved in an organic solvent and may optionally be combined with one or more suitable surfactants may be used to stabilize the emulsion.

Any aliphatic isocyanates having at least three isocyanate functionalities may be used in the preparation of the fluorochemical polymer. Among this class of useful compounds are aliphatic triisocyanate-functional biurets of the formula:

wherein x is an integer greater than or equal to 1, preferably 1 to 3, most preferably 1 and $R_h$ is a divalent noncyclic, linear or branched alkylene group and may be, for example, hexamethylene, ethylene, or butylene. Also useful are isocyanurate trimers of the formula:

wherein $R_h$ is as previously described.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyfunctional isocyanate compounds generally provide better light stability than the aromatic compounds.

Examples of useful cycloaliphatic polyfunctional isocyanate compounds include, but are not limited to, those selected from the group consisting of dicyclohexylmethane diisocyanate ($H_{12}$MDI, commercially available as Desmodur™W, available from Bayer Corporation, Pittsburgh, Pa.), 4,4'-isopropylbis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as Desmodur™ N-100 and N-3200 from Bayer Corporation, Pittsburgh, Pa.), the isocyanurate of HDI (available as Demodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Suitable commercially available polyfunctional isocyanates are exemplified by Desmodur™ N-3200, Desmodur™ N-3300, Desmodur™ N-3400, Desmodur™ N-3600, Desmodur™ H (HDI), and Desmodur™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE 3160 (American Cyanamid, Stamford, Conn.).

Because of their widespread commercial availability, polyisocyanate-functional biurets and isocyanurates derived from the homopolymerization of hexamethylene diisocyanate are preferred for use in accordance with this invention. Such compounds are sold, for example, under the Desmodur tradename, whose products are available from Miles Corp.

Isocyanate group that remain after reaction with the fluorochemical monofunctional compound(s) and the aliphatic monofunctional compound(s) may optionally be blocked isocyanate groups. By the term "blocked isocyanate" is meant a (poly)isocyanate of which the isocyanate groups have been reacted with a blocking agent. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked (poly)isocyanate compound thereby generating the isocyanate group again which can then react with an isocyanate reactive group. Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14–172.

The blocked isocyanate is generally a blocked di- or triisocyanate or a mixture thereof and can be obtained by reacting an isocyanate with a blocking agent that has at least one functional group capable of reacting with an isocyanate group. Preferred blocked isocyanates are blocked polyisocyanates that at a temperature of less than 150° C. are capable of reacting with an isocyanate reactive group, preferably through deblocking of the blocking agent at elevated temperature. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

Representative fluorochemical monofunctional compounds useful in forming the fluorochemical urethane compositions may be depicted by the formula:

$$R_f SO_2 N(R^1) R^2 Z$$

wherein:

$R_f$ represents a perfluoroalkyl or perfluoroheteroalkyl group having from 3 to about 6 carbon atoms, more preferably having from about 3 to about 5 carbon atoms; $R_f$ can contain straight chain, branched chain, or cyclic fluorinated alkylene groups or combinations thereof with straight chain, branched chain or cyclic alkylene groups; $R_f$ is preferably free of polymerizable olefinic unsaturation and can optionally contain catenary heteroatoms such as oxygen, divalent or hexavalent sulfur, or nitrogen; a fully fluorinated radical is preferred, but hydrogen or chlorine atoms may be present as substituents provided that not more than one atom of either is present for every two carbon atoms; the terminal portion of the $R_f$ group is fully fluorinated, preferably containing at least 7 fluorine atoms, e.g., $CF_3CF_2CF_2-$, $(CF_3)_2CF-$, $-CF_2SF_5$ or the like. Preferably, $R_f$ contains from about 40% to about 80% fluorine by weight, more preferably from about 50% to about 78% fluorine by weight; perfluorinated aliphatic groups (i.e., perfluoroalkyl groups of the formula $C_nF_{2n+1}-$) are the most preferred embodiments of $R_f$;

$R^1$ is a hydrogen or lower alkyl group, such as a $C_1$–$C_4$ alkyl group;

$R^2$ is an alkylene group or heteroalkylene group, preferably a $C_1$–$C_4$ alkylene group; and Z is a functional group capable of reacting with the isocyanate groups f the polyisocyanate. Useful Z groups include, but are not limited to $-NH_2$, $-SH$, $-OH$, $-NCO$, $NR^1H$, where $R^1$ is as previously defined.

A mixture of one or more such fluorochemical monofunctional compounds are also considered useful.

Representative fluorochemical monofunctional compounds include

The aliphatic monofunctional compounds that optionally may be combined with the fluorochemical monofunctional compounds in the formation of the fluorochemical urethane compositions of the invention may be used to reduce the overall cost of the treatment composition without suffering an attendant reduction in the performance obtained by the fluorochemical properties of the treatments. If employed, the aliphatic monofunctional compound may be added in amounts sufficient to react with any remaining isocyanate groups. Generally the aliphatic monofunctional compound is not be added in amounts greater than 33%, preferably less than 20% of the available isocyanate groups. Useful aliphatic monofunctional compound include straight chain, branched chain, or cyclic aliphatic monofunctional compound containing from 1 to 72 carbon atoms. Such aliphatic monofunctional compound are preferably free of polymerizable olefinic unsaturation and optionally can contain catenary heteroatoms such as oxygen, divalent or hexavalent sulfur, or nitrogen.

Useful non-fluorinated monofunctional compounds include those of the formula R'''-Z, wherein R''' is an aliphatic alkyl or heteroalkyl group and Z is an isocyanate-reactive functional group. Useful Z groups include, but are not limited to —$NH_2$, —SH, —OH, —NCO, $NR^1H$, where $R^1$ is a hydrogen or lower alkyl group, such as a $C_1$–$C_4$ alkyl group.

Other preferred embodiments of the chemical composition of the present invention include those compositions derived from long-chain aliphatic monofunctional compounds having 12 to 72 carbons. Long-chain hydrocarbon groups typically have been known to impart poor oil repellency; however, the chemical compositions of the present invention comprising terminal long-chain hydrocarbon groups having 12 to 72 carbons impart good stain-release properties. Long-chain aliphatic monofunctional compounds suitable for use in the chemical compositions of the present invention comprise at least one, essentially unbranched, aliphatic alcohols having from 12 to about 72 carbon atoms which may be saturated, unsaturated, or aromatic. These long-chain hydrocarbon monoalcohols can be optionally substituted, for example, with groups such as one or more chlorine, bromine, trifluoromethyl, or phenyl groups. Representative long-chain hydrocarbon monoalcohols include 1-octanol, 1-decanol, 1-dodecanol, 1-tetradecanol, 1-hexadecanol,1-octadecanol, and the like, and mixtures thereof. Preferred long-chain hydrocarbon monoalcohols have 12 to 50 carbon atoms, with 12 to 50 carbon atoms being more preferred and 18–40 carbon atoms being most preferred for water solubility and performance.

Also useful in the present invention as fiber treatments are blends of the fluorochemical urethane treatments with fluorine-free extender compounds. These extender compounds, which are only optional components of the system, may be added to reduce the overall expense of the treatment without limiting the performance obtained by the fluorochemical characteristic of the applied treatment. Among the fluorine-free compounds useful as treatment extenders are siloxanes, acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensation of fatty acids with polyamides and their epichlorohydrin adducts, waxes, polyethylene, chlorinated polyethylene, alkyl ketene dimers, esters, and amides. Blends of these fluorine-free extender compounds are also considered useful. The relative amount of the extender compounds in the treatment is not critical to the present invention. The overall composition of the fluorochemical treatment should contain, however, relative to the mount of solids present in the overall system, at least 3 weight percent, preferably at least about 5 weight percent, carbon-bound fluorine.

The chemical compositions of the present invention can be made according to the following step-wise synthesis. As one skilled in the art would understand, the order of the steps is non-limiting and can be modified so as to produce a desired chemical composition. In the synthesis, the polyfunctional isocyanate compound and the fluorochemical monofunctional compound(s) are dissolved together under dry conditions, preferably in a solvent, and then heating the resulting solution at approximately 40 to 80° C., preferably approximately 60 to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/fluorochemical monofunctional compound mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred.

The resulting isocyanate functional urethane oligomers and compounds may then further reacted with one or more of the aliphatic monofunctional compounds described above. The monofunctional compounds are added to the above reaction mixture, and react(s) with up any remaining available —NCO groups. The above temperatures, dry conditions, and mixing are continued one-half to two hours, preferably one hour. Terminal fluorine-containing and optionally non-fluorinated aliphatic groups are thereby bonded to the urethane compounds.

Each fluorochemical urethane compound comprises a urethane group that is derived or derivable from the reaction of at least one polyfunctional isocyanate compound and at least one fluorochemical monofunctional compound. The fluorochemical urethane compound is terminated with (i) one or more perfluoroalkyl groups, or one or more perfluoroheteroalkyl groups; and (ii) optionally one or more non-fluorinated aliphatic groups. It will be understood that the reaction product will provide a mixture of compounds, some percentage of which will comprise compounds as described, but may further comprise urethane compounds having different substitution patterns and degree of substitution. Thus the compositions may include compounds of the formula:

$(R_f^*)_n A(NHCO\text{-}Z'R''')_{m-n}$, wherein $R_f^*$ is $R_f$—$SO_2N(R^1)$—$R^2$-Z', Z' is the residue of Z, A is the residue of said aliphatic isocyanate, having valency m, R''' is an aliphatic radical derived from the aliphatic monofunctional compound, and n (average) is at least 1.5, preferably at least 2.

The fluorochemical urethane treatments preferably are applied to a substrate along with one or more non-fluorinated compounds known in the art to impart anti-staining properties when applied to a substrate with a fluorochemical agent. These anti-staining compounds may constitute a pretreatment to application of the fluorochemical treatments of the invention, i.e., they can be applied prior to the application of the fluorochemical treatment, or alternatively may be applied coincident with the fluorochemical treatment, i.e., in the same processing step. These compounds, known in the art generally as "stainblockers," include hydrophilic anti-staining compounds such as acrylic and methacylic acid polymers and copolymers, sulfonated phenol-formaldehyde resins, alpha-olefin maleic anhydride copolymers, and styrene-maleic anhydride polymers and copolymers. Blends of such compounds are also considered useful.

Additional non-fluorinated anti-staining compounds suitable for use in the invention include those sulfonated novolak resin compositions described by U.S. Pat. Nos. 5,098,774 (Chang) and U.S. Pat. No. 5,316,850 (Sargent et at.), both of whose descriptions are herein incorporated by reference. The anti-staining compositions typically are applied to the substrate at levels between 0.15 and 3 weight percent of the hydrophilic anti-staining compound or compounds based on the weight of the fiber. One particularly useful stainblocker is FX-657™ available from the 3M Company.

Fibrous substrates that can be treated in accordance with the invention are textile fibers (or filaments) and fabrics, including fabrics made into finished products, made from cotton, polyester, polyolefin, polyamide, acrylic, acetate or blends thereof, as well as finished garments, upholstered furniture, and installed carpet. The fibers or filaments as such or in aggregated form, e.g. yarn, tow, web or roving, or fabric such as woven or knit fabric can be treated with the composition of the invention.

The urethane compositions of the present invention may be dissolved in a variety of solvents to form treatment compositions suitable for use in the treatment of fibrous substrates. Treatment compositions preferably contain from about 0.1 to about 10 percent fluorochemical urethane composition, based on the weight of the treatment composition. Preferably the fluorochemical urethane composition is used in the treatment composition at about 0.05 to about 10 weight percent, most preferably from about 0.1 to about 3 weight percent. Suitable solvents include water, alcohols, esters, glycol ethers, amides, ketones, hydrocarbons, chlorohydrocarbons, chlorocarbons, and mixtures thereof. Depending upon the substrate to which the composition is being applied, water is the preferred solvent because it does not raise any environmental concerns and is accepted as safe and non-toxic.

The treatment composition containing the fluorochemical urethane compounds may be applied to a fibrous substrate using any state of the art application method. Typically, the composition will be applied by spraying directly and evenly onto the dry or prewet substrate, by immersing (e.g., padding) the substrate into the composition, or by foam application of the composition onto the substrate, or spray application. The treatment usually may be heat cured by drying the treated substrate in an oven held at between 200° F. and 300° F., although the treatment may also be left to cure onto the substrate under ambient conditions. The concentration of the fluorochemical treatment within the complete aqueous composition of this invention may be independently chosen to yield a desired concentration of treatment on the finished substrate given a choice of processing parameters, e.g., roller speed, drying capacity, as is known in the art.

The following examples are offered to aid in a better understanding of the present invention. These examples are not to be construed as an exhaustive compilation of all embodiments of the present invention and are not to be unnecessarily construed as limiting the scope thereof.

TABLE 1

| Designation | Material/Structure | Availability/Preparation |
|---|---|---|
| $C_3F_7CONHC_2H_4OH$ | $C_3F_7CONHC_2H_4OH$ | Can be prepared by reacting $C_3F_7CO_2CH_3$ with ethanolamine as described in JACS, 77 4930 (1955) |
| $C_4F_9C_2H_4OH$ | $C_4F_9C_2H_4OH$ | ABCR, Karlsruhe, Germany |
| $C_5F_{11}CH_2OC_2H_4OH$ | $C_5F_{11}CH_2OC_2H_4OH$ | U.S. Pat. No. 5,437,812 Ex 25 |
| $C_5F_{11}CH_2OH$ | $C_5F_{11}CH_2OH$ | Can be prepared following procedure in U.S. Pat. No. 2,666,297 |
| $C_5F_{11}CONHC_2H_4OH$ | $C_5F_{11}CONHC_2H_4OH$ | Can be prepared by reacting $C_5F_{11}CO_2CH_3$ with ethanolamine as described in JACS, 77 4930 (1955) |
| $C_6F_{13}CF(CF_3)CONHC_2H_4OH$ | $C_6F_{13}CF(CF_3)CONHC_2H_4OH$ | Can be made from $C_6F_{13}CF(CF_3)CO_2CH_3$ (Ex. C3 of U.S. Pat. No. 6,013,795) and ethanolamine (JACS, 77, 6662 1955) |
| $C_6F_{13}CH_2OC_2H_4OH$ | $C_6F_{13}CH_2OC_2H_4OH$ | Can be made by replacing $C_5F_{11}CH_2OH$ with $C_6F_{13}CH_2OH$ (U.S. Pat. No. 5,437,812 Ex 25) |
| $C_6F_{13}C_2H_4OH$ | $C_6F_{13}C_2H_4OH$ | ABCR |
| $C_6F_{13}SO_2N(CH3)C_2H_4OH$ | $C_6F_{13}SO_2N(CH_3)C_2H_4OH$ | Made by reacting perfluorohexanesulfonyl fluoride with $CH_3NH_2$ and ethylene chlorohydrin, essentially as described in Ex. 1 of U.S. Pat. No. 2,803,656 (Ahlbrecht, et al.) |
| $C_7F_{15}CH_2OC_2H_4OH$ | $C_7F_{17}CH_2OC_2H_4OH$ | U.S. Pat. No. 5,437,812 Ex 24 |
| $C_7F_{15}CH_2OH$ | $C_7F_{15}CH_2OH$ | Sigma-Aldrich |
| $C_7F_{15}CON(CH_3)C_2H_4OH$ | $C_7F_{15}CON(CH_3)C_2H_4OH$ | Can be prepared by reacting $C_7F_{15}CO_2CH_3$ with N-methylaminoethamol as described in JACS, 77 4930 (1955) |

TABLE 1-continued

| Designation | Material/Structure | Availability/Preparation |
|---|---|---|
| $C_9F_{19}CH_2OC_2H_4OH$ | $C_9F_{19}CH_2OC_2H_4OH$ | Can be made by replacing $C_5F_{11}CH_2OH$ with $C_9F_{19}CH_2OH$ (U.S. Pat. No. 5,437,812 Ex 25) |
| $C_8F_{17}C_2H_4OH$ | $C_8F_{17}C_2H_4OH$ | ABCR |
| DBTDL | Dibutyltin dilaurate; $[CH_3(CH_2)_3]_2Sn[CO_2(CH_2)_{10}CH_3]_2$ | Sigma-Aldrich, Milwaukee, WI |
| Ethanolamine | $NH_2CH_2CH_2OH$ | Sigma-Aldrich |
| Ethyl acetate | $CH_3C(O)OC_2H_5$ | Sigma-Aldrich |
| MeFBSE | N-methylperfluorobutanesulfonyl ethanol; $C_4F_9SO_2N(CH_3)CH_2CH_2OH$ | Made by reacting perfluorobutanesulfonyl fluoride with $CH_3NH_2$ and ethylene chlorohydrin, essentially as described in Ex. 1 of U.S. Pat. No. 2,803,656 (Ahlbrecht, et al.) |
| MeFOSE | $C_8F_{17}SO_2N(CH_3)C_2H_4OH$ | Made by reacting perfluorooctanesulfonyl fluoride with $CH_3NH_2$ and ethylene chlorohydrin, essentially as described in Ex. 1 of U.S. Pat. No. 2,803,656 (Ahlbrecht, et al.) |
| Methanol | $CH_3OH$ | Sigma-Aldrich |
| 4-Methyl-2-pentanone | $(CH_3)_2CHCH_2C(O)CH_3$ | Sigma-Aldrich |
| MIBK | Methylisobutyl ketone; $(CH_3)_2CHCH_2C(O)CH_3$ | Sigma-Aldrich |
| N100 | DESMODUR ™ N 100; Polyfunctional isocyanate resin based on hexamethylene diisocyanate | Bayer, Pittsburgh. PA |
| N3300 | DESMODUR ™ N 3300; Polyfunctional isocyanate resin based on hexamethylene diisocyanate | Bayer |
| SA | Stearyl alcohol; $CH_3(CH_2)_{16}CH_2OH$ | Sigma-Aldrich |
| UNILIN 550 | Polyethylene alcohol; $MW_{avg} = 550$ | Baker Petrolite, Tulsa, Oklahoma |
| WITCONATE ™ DS-10 | Sodium dodecylbenzene sulfonate | Witco SA, Paris, France |

Test Methods

Water Repellency Test

Treated carpet samples were evaluated for water repellency using 3M Water Repellency Test II: Water/alcohol Drop Test (Document #98-0212-0721-6; available from 3M) In this test, carpet samples to be evaluated are challenged to penetrations by blends of DI water and isopropyl alcohol (IPA). Each blend is assigned a rating number as shown in Table 2. In running the Water Repellency Test, a treated carpet samples placed on a flat, horizontal surface and the carpet pile is hand-brushed in the direction giving greatest lay to the yarn. Five small drops of water, IPA or water/IPA mixture are gently placed at points at least two inches (5.0 cm) apart on the carpet sample. If, after observing for ten seconds at a 45° angle, four of the five drops are visible as a sphere or hemisphere, the carpet is deemed to pass the test. The reported water repellency rating corresponds to the highest numbered water, IPA or water/IPA mixture for which the treated sample passes the described test.

TABLE 2

| Water Repellemcy Rating Number | Water/IPA Blend (% by volume) |
|---|---|
| F | Fails water |
| 0 | 100% water |
| 1 | 90/10 |
| 2 | 80/20 |
| 3 | 70/30 |
| 4 | 60/40 |
| 5 | 50/50 |
| 6 | 40/60 |
| 7 | 30/70 |
| 8 | 20/80 |

TABLE 2-continued

| Water Repellemcy Rating Number | Water/IPA Blend (% by volume) |
|---|---|
| 9 | 10/90 |
| 10 | 100% IPA |

Oil Repellency Test

Carpet samples were evaluated for oil repellency using 3M Oil Repellency Test III (February 1994 Document #98-0212-0713-3; available from 3M) In this test, carpet samples are challenged to penetration by oil or oil mixtures of varying surface tensions. Oils and oil mixtures are given ratings described in Table 3. The oil repellency test is run in the same manner as the water repellency test listed above, with the reported oil repellency corresponding to the highest oil or oil mixture for which the treated carpet sample passes the test.

TABLE 3

| Oil Repellency Rating Number | Oil Composition |
|---|---|
| F | Fails mineral oil |
| 1 | Mineral oil |
| 1.5 | 85/15 mineral oil/n-hexadecane (% vol) |
| 2 | 65/35 mineral oil/n-hexadecane (% vol) |
| 3 | n-hexadecane |
| 4 | n-tetradecane |
| 5 | n-dodecane |
| 6 | n-decane |

Dynamic Contact Angle Measurement

Advancing and receding contact angles were measured using a CAHN Dynamic Contact Angle Analyzer Model DCA 322 (available from Thermo Cahn, Madison, Wis.) with a Wilhelmy balance apparatus (available from ATI, Madison, Wis.) equipped with a computer for control and data processing. Larger values of contact angles indicate better repellency.

Simulated Flex-Nip Application Procedure

The simulated Flex-Nip described below was used to simulate the flex-nip operation used by carpet mills to apply stain-blocking compositions to carpet.

In this test, a carpet sample measuring approximately 13 cm×10 cm is immersed in DI water at room temperature until dripping wet. Water is extracted from the wet sample by spinning in a Bock Centrifugal Extractor until the sample is damp. The damp sample is the steamed form 2 minutes at atmospheric pressure, at a temperature of 90–100° C., and 100% relative humidity in an enclosed steam chamber.

After steaming the carpet sample is allowed to cool to near room temperature, and the aqueous treating composition is applied by placing the carpet sample, carpet fiber side down, in a glass tray containing the treating composition. The treating composition contains sufficient glassy fluorochemical and/or hydrocarbon material and sufficient stain-blocking material to give the desired percent solids on fiber (% SOF) and is prepared by dissolving or dispersing the two types of materials and optionally the desired amount of salt in DI water and adjusting the pH to a value of 2 (unless otherwise specified) using 10% aqueous sulfamic acid. The weight of the aqueous treating solution in the glass tray is approximately 3.5 to 4.0 times the weight of the carpet sample. The carpet sample absorbs the entire volume of treating solution over a 1 to 2 minute period to give a percent wet pick-up of 350–400%.

Then the wet, treated carpet sample is steamed a second time for two minutes (using the same equipment and conditions as described above), immersed briefly in a 5-gallon (20 liter) pail half full of DI water, rinsed thoroughly under a DI water stream to remove residual, excess treatment composition, spun to dampness using the centrifugal extractor, and allowed to air-dry overnight at room temperature before testing.

Dynamic Water Resistance Test

Dynamic water resistance was determined using the following test procedure. A treated carpet sample (15.2 cm.× 15.2 cm.) is inclined at an angle of 45% from horizontal and 20 mL of DI water is impinged onto the center of the sample through a glass tube with a 5 mm inside diameter, positioned 45.7 cm above the test sample. The increase in weight (g) of the test sample is measured, with lower weight gains indicating better dynamic water repellency properties.

Staining Test

Stain resistance was determined using the following test procedure. A treated carpet sample (13 cm×10 cm) is stained for 2 minutes by immersing the carpet sample on an aqueous solution of 0.007% of Red Dye FD&C #40 in DI water adjusted to a pH of 2.8 wit 10% aqueous sulfamic acid. The dye solution is warmed to a temperature in the range 55–70° C. The treated, stained carpet sample is then immersed briefly into a 5-gallon (20 liter) pail half full of DI water, followed by a rinse under a stream of DI water until the water runs clear. The wet carpet sample is then extracted to dampness using a Bock Centrifugal Extractor and is air-dried overnight at room temperature.

The degree of staining of the carpet was assigned a numerical rating by using a 310 Minota Chroma Meter™ (available from Minolta, Inc, Osaka, Japan) compact tristimulus color analyzer. The color analyzer measures the red stain color autochromically on the red-green color coordinate as a delta a ($\Delta a$) value as compared to the color of an unstained and untreated carpet sample. Measurements recorded below are given to one place following the decimal point and represent the average of three measurements, unless otherwise stated. A greater $\Delta a$ value indicates a greater amount of staining from the red dye. $\Delta a$ readings typically vary from 0 (no staining) to 50 (severe staining).

Fluorine Analysis—Combustion Test

This test is designed to determine the amount of fluorine present on a substrate using combustion techniques.

Ignition Basket Assembly: Two 18 gauge platinum wires are inserted through a # 9 rubber stopper allowing ¼ inch of each wire to protrude on one side of the stopper, to facilitate attachment of the power supply, and six inches of each wire to protrude on the other side of the rubber stopper. The six inch lengths are attached to opposite ends of a 45 mesh platinum sample cylinder (length=1 inch; circumference=1 ½ inches).

Procedure: Weigh 0.10 to 0.12 grams of fabric substrate and place the sample into the sample cylinder of the ignition basket assembly. Pipet 15 mL of deionized water into a clean, dry 1 L polycarbonate flask. Purge the flask for 30 seconds with oxygen and immediately place the platinum electrode assembly into the flask, securing the stopper. Invert the flask and place it at a slight angle into a ring supported by a ring stand. Be sure that the sample does not get wet.

Attach the wires from the 10,000 volt power supply to the platinum electrodes. Turn the Variac™ on and turn the dial clockwise until the sample ignites. When the sample is completely burned, turn the Variac™ dial back to zero and detach the wires from the electrode. Remove the flask from the ring stand and shake for two minutes, making sure that the platinum cylinder is completely rinsed. Let the flask stand for 30 minutes, shaking occasionally.

Pipet 5 mL of the solution recovered from the combustion flask and 5 mL of total ionic strength adjustor buffer (TISB IV) buffer solution (84 mL concentrated HCl, 242 g tris (hydroxymethyl) amino methane, 230 g sodium tartrate, diluted to 1 liter with deionized water) into a clean 50 mL plastic beaker. Place the electrodes in the beaker (Model #94-09 Fluoride ion Electrode and Model #90-01 Single Junction Reference Electrode; available from Orion research Inc, Boston, Mass.), turn on stirrer and record the microgram reading after the instrument stabilizes. Rinse and dry electrodes and calculate the ppm concentration of fluoride ion ($F^-$) from the microgram reading as follows:

$$\frac{\text{Micrograms reading} \times 3}{\text{Sample weight (g)}} = \text{ppm F in sample}$$

A more detailed description of the test is written in the 3M Protective Material Division's "Fluorine Analysis Combustion Test" method (Document #98-0212-0723-2; May 1999).

EXAMPLES 1 AND 2

Preparation of MeFBSE/N100 Urethane

A 500 mL round bottom flask equipped with a magnetic stirrer and fitted with a condenser was charged with MeFBSE (65.0 grams), MIBK (100.0 grams) and N100 (34.9 grams). Upon dissolution, the mixture was heated to reflux, DBTDL (0.02 grams) was added, and heating was continued for one hour. The solution was cooled, and yielded MeFBSE/N100 Urethane.

EXAMPLE 3

Preparation of MeFBSE/N3300 Urethane

A 25 mL flask equipped with a magnetic stirrer, heating mantle, thermometer, condenser and nitrogen purge was charged with N3300 (2.10 grams), MeFBSE (3.83 grams) and ethyl acetate (10.0 grams). After all the solids were dissolved, DBTDL (2 drops) was added. The temperature of the stirred mixture was maintained at 60° C. for 4 hours under nitrogen The reaction was monitored by FTIR analysis, which showed the disappearance of the —NCO band at approximately 2289 wavenumbers. The peaks at 3341 cm$^{-1}$ and 1726 cm$^{-1}$ corresponded to N—H (strong) and C═O bonds (very strong), indicating conversion to polyurethane.

EXAMPLES 4–5

Preparation of MeFBSE/N3300 Urethane

A 500 mL round bottom flask equipped with a magnetic stirrer and fitted with a condenser was charged with MeFBSE (65.0 grams), MIBK (100.0 grams) and N3300 (35.3 grams). Upon dissolution, the mixture was heated to reflux, DBTDL (0.02 grams) was added, and heating was continued for one hour. The solution was cooled, and yielded MeFBSE/N3300 Urethane. A solution of Witconate DS-10 (5 grams) in DI water (400 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The solvent was removed using a rotary evaporator.

EXAMPLE 6

Preparation of $C_6F_{13}SO_2N(CH3)C_2H_4OH$/N100 Urethane

A 500 mL three-necked round bottom flask was charged with $C_6F_{13}SO_2N(CH3)C_2H_4OH$ (36.0 grams), N100 (15.1 grams) and ethyl acetate (53.6 grams). The ensuing mixture was stirred until all materials were dissolved. To the solution was added DBTDL (0.1 gram), and the stirred mixture was heated to 75° C. under nitrogen overnight. A solution of Witconate DS-10 (2.5 grams) in DI water (160.8 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The ethyl acetate was removed using a rotary evaporator, yielding $C_6F_{13}SO_2N(CH3)C_2H_4OH$/N100 Urethane

EXAMPLE 7

Preparation of MeFBSE/N3300/SA Urethane

A 500 mL round bottom flask equipped with a magnetic stirrer and fitted with a condenser was charged with MeFBSE (58.0 grams), MIBK (100.0 grams), SA (6.0 grams) and N3300 (36.0 grams). Upon dissolution, the mixture was heated to reflux, DBTDL (0.02 grams) was added, and heating was continued for one hour. The solution was cooled, and yielded MeFBSE/N3300/SA Urethane.

EXAMPLE 8

N-3300/MEFBSE/UNILIN™ 550 Urethane

To N3300 (60 grams ) in MIBK (200 ml) was added of MeFBSE (73.65 grams) and one drop DBTDL. The mixture was heated for 3 hrs at 75° C. before the temperature was raised to 90° C. and UNILIN™ 550 (60.5 grams ) was added. The reaction was complete within 2hrs as indicated by the disappearance of —NCO band (2289 wavenumber) by FTIR analysis.

EXAMPLE C1

Preparation of $C_3F_7CONHC_2H_4OH$/N3300 Urethane

A 500 mL round bottom flask equipped with a magnetic stirrer and fitted with a condenser was charged with $C_3F_7CONHC_2H_4OH$ (30.0 grams), ethyl acetate (53.0 grams) and N3300 (22.6 grams). Upon dissolution, the mixture was heated to 80° C., DBTDL (one drop) was added, and heating was continued for 16 hours. The reaction was monitored by FTIR analysis, which showed the disappearance of the —NCO band at approximately 2289 wavenumbers. A solution of Witconate DS-10 (2.6 grams) in DI water (200.0 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for 8 minutes. The ethyl acetate was removed using a rotary evaporator, yielding $C_3F_7CONHC_2H_4OH$/N3300 Urethane.

EXAMPLE C2

Preparation of $C_4F_9C_2H_4OH$/N3300 Urethane

A round bottom flask equipped with a magnetic stirrer and fitted with a condenser was charged with $C_4F_9C_2H_4OH$ (5.0 grams), MIBK (8.7 grams) and N3300 (3.7 grams). Upon dissolution, the mixture was heated to reflux, DBTDL (0.003 grams) was added, and heating was continued for one hour. The solution was cooled, and yielded $C_4F_9C_2H_4OH$/N3300 Urethane.

EXAMPLE C3

Preparation of $C_5F_{11}CH_2OC_2H_4OH$/N100 Urethane

A 500 mL three-necked round bottom flask was charged with $C_5F_{11}CH_2OCH_2CH_2OH$ (34.4 grams), N100 (19.0 grams) and 4-methyl-2-pentanone (71.3 grams). The ensuing mixture was stirred until all materials were dissolved. To the solution was added DBTDL (0.1 gram), and the stirred mixture was heated to 80° C. under nitrogen overnight. A solution of Witconate DS-10 (2.7 grams) in DI water (214 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The 4-methyl-2-pentanone was removed using a rotary evaporator, yielding $C_5F_{11}CH_2OC_2H_4OH/N100$ urethane.

EXAMPLE C4

Preparation of $C_5F_{11}CH_2OH/N100$ Urethane

To a 100 mL flask equipped with a magnetic stirrer, heating mantle, thermometer, condenser and nitrogen purge was charged with N100 (11.0 grams), $C_5F_{11}CH_2OH$ (17.28 grams) and ethyl acetate (40 grams). To this solution was added 2 drops of DBTDL. The temperature of the stirred mixture was maintained at 70° C. for 10 hours, under nitrogen. The reaction was monitored by FTIR analysis, which showed the disappearance of the —NCO band at approximately 2289 wavenumbers.

EXAMPLE C5

Preparation of $C_5F_{11}CH_2OH/N3300$ Urethane

A 100 mL flask equipped with a magnetic stirrer, heating mantle, thermometer, condenser and nitrogen purge was charged with N3300 (10.0 grams), C5F11CH2OH (15.5 grams) and EtOAc (40 grams). To this solution, was added 2 drops of DBTDL catalyst, and the stirred mixture was maintained at a temperature of 70° C. for 10 hours under nitrogen. The reaction was monitored by FTIR analysis, which showed the disappearance of the —NCO band at approximately 2289 wavenumbers.

EXAMPLE C6

Preparation of $C_5F_{11}CH_2OH/N100$ Urethane

A 500 mL three-necked round bottom flask was charged with $C_5F_{11}CH_2OH$ (30.8 grams), N100 (19.6 grams) and ethyl acetate (51.6 grams). The ensuing mixture was stirred until all materials were dissolved. To the solution was added DBTDL (0.1 gram), and the stirred mixture was heated to 75° C. under nitrogen overnight. A solution of Witconate DS-10 (2.5 grams) in DI water (154.8 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The ethyl acetate was removed using a rotary evaporator, yielding $C_5F_{11}CH_2OH/N100$ Urethane

EXAMPLE C7

Preparation of $C_5F_{11}CONHC_2H_4OH/N100$ Urethane

A 500 mL three-necked round bottom flask was charged with $C_5F_{11}CONHC_2H_4OH$ (35.7 grams), N100 (19.0 grams) and ethyl acetate (250 mL). The ensuing mixture was stirred until all materials were dissolved. To the solution was added DBTDL (0.1 gram), and the stirred mixture was heated to 80° C. under nitrogen overnight. The ethyl acetate was removed using a rotary evaporator, yielding $C_5F_{11}CONHC_2H_4OH/N100$ Urethane

EXAMPLE C8

Preparation of $C_5F_{11}CONHC_2H_4OH/N3300$ Urethane

A 500 mL round bottom flask equipped with a magnetic stirrer and fitted with a condenser was charged with $C_5F_{11}CONHC_2H_4OH$ (30.0 grams), ethyl acetate (46.3 grams) and N3300 (16.3 grams). Upon dissolution, the mixture was heated to 80° C., DBTDL (one drop) was added, and heating was continued for 16 hours. The reaction was monitored by FTIR analysis, which showed the disappearance of the —NCO band at approximately 2289 wavenumbers. A solution of Witconate DS-10 (2.3 grams) in DI water (220.0 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for 8 minutes. The ethyl acetate was removed using a rotary evaporator, yielding $C_5F_{11}CONHC_2H_4OH/N3300$ Urethane.

EXAMPLE C9

Preparation of $C_6F_{13}CF(CF_3)CONHC_2H_4OH/N100$ Urethane

A 500 mL three-necked round bottom flask was charged with $C_6F_{13}CF(CF_3)CONHC_2H_4OH$ (28.7 grams), N100 (10.8 grams) and ethyl acetate (41.5 g The ensuing mixture was stirred until all materials were dissolved. To the solution was added DBTDL (0.1 gram), and the stirred mixture was heated to 75° C. under nitrogen overnight. A solution of Witconate DS-10 (2.0 grams) in DI water (124.4 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The ethyl acetate was removed using a rotary evaporator, yielding $C_6F_{13}CF(CF_3)CONHC_2H_4OH/N100$ Urethane

EXAMPLE C10

Preparation of $C_6F_{13}CH_2OC_2H_4OH/N100$ Urethane

A 500 mL three-necked round bottom flask was charged with $C_6F_{13}CH_2OC_2H_4OH$ (33.7 grams), N100 (16.3 grams) and 4-methyl-2-pentanone (70.0 grams). The ensuing mixture was stirred until all materials were dissolved. To the solution was added DBTDL (0.1 gram), and the stirred mixture was heated to 80° C. under nitrogen overnight. A solution of Witconate DS-10 (2.5 grams) in DI water (210.2 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The 4-methyl-2-pentanone was removed using a rotary evaporator, yielding $C_6F_{13}CH_2OC_2H_4OH/N100$ urethane.

EXAMPLE C11

Preparation of $C_6F_{13}C_2H_4OH/N3300$ Urethane

A round bottom flask equipped with a magnetic stirrer and fitted with a condenser was charged with $C_6F_{13}C_2H_4OH$ (10.0 grams), MIBK (15.4 grams) and N3300 (5.4 grams). Upon dissolution, the mixture was heated to reflux, DBTDL (0.003 grams) was added, and heating was continued for one hour. The solution was cooled, and yielded $C_6F_{13}C_2H_4OH/$N3300 Urethane.

EXAMPLE C13

Preparation of $C_7F_{15}CH_2OC_2H_4OH/N100$ Urethane

A 500 mL three-necked round bottom flask was charged with $C_7F_{17}CH_2OC_2H_4OH$ (35.0 grams), N100 (15.1 grams) and 4-methyl-2-pentanone (70.0 grams). The ensuing mixture was stirred until all materials were dissolved. To the solution was added DBTDL (0.1 gram), and the stirred mixture was heated to 80° C. under nitrogen overnight. A solution of Witconate DS-10 (2.5 grams) in DI water (210.3 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The 4-methyl-2-pentanone was removed using a rotary evaporator, yielding $C_7F_{15}CH_2OC_2H_4OH/N100$ urethane.

EXAMPLE C14

Preparation of $C_7F_{15}CH_2OH/N100$ Urethane

A 500 mL three-necked round bottom flask was charged with $C_7F_{15}CH_2OH$ (33.0 grams), N100 (15.1 grams) and 4-methyl-2-pentanone (70.0 grams). The ensuing mixture was stirred until all materials were dissolved. To the solution was added DBTDL (0.1 gram), and the stirred mixture was heated to 80° C. under nitrogen overnight. A solution of Witconate DS-10 (2.5 grams) in DI water (210.3 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The 4-methyl-2-pentanone was removed using a rotary evaporator, yielding $C_7F_{15}CH_2OH/N100$ urethane.

EXAMPLE C15

Preparation of $C_7F_{15}C(O)N(CH_3)C_2H_4OH/N3300$ Urethane

Preparation of $C_7F_{15}C(O)N(CH_3)C_2H_4OH$:

$C_7F_{15}C(O)N(CH_3)C_2H_4OH$ was prepared by combining n-$C_7F_{15}CO_2CH_3$ (85 grams) and $CH_3NHCH_2CH_2OH$ (16.5 grams) in THF (50 grams) at 50° C. Progress of the reaction was monitored by GC and FTIR spectra. The isolated yield was 76.4% of $C_7F_{15}C(O)N(CH_3)C_2H_4OH$. (b.p.: 110–125° C./1.5–3 mmHg).

A 100 mL flask equipped with a magnetic stirrer, heating mantle, thermometer, condenser and nitrogen purge was charged with N3300 (5 grams), 12.2 g (25.9 mmol OH) of $C_7F_{15}C(O)N(CH_3)C_2H_4OH$ (12.2 grams) and ethyl acetate (20g) in the presence of DBTDL (2 drops) at 70° C. for 10 hours under $N_2$. The reaction was monitored by FTIR analysis, which showed the disappearance of the —NCO band at approximately 2289 wavenumbers.

EXAMPLE C16

Preparation of $C_9F_{19}CH_2OC_2H_4OH/N100$ Urethane

A 500 mL three-necked round bottom flask was charged with $C_9F_{19}CH_2OC_2H_4OH$ (37.0 grams), N100 (13.0 grams) and 4-methyl-2-pentanone (70.0 grams). The ensuing mixture was stirred until all materials were dissolved. To the solution was added DBTDL (0.1 gram), and the stirred mixture was heated to 80° C. under nitrogen overnight. A solution of Witconate DS-10 (2.5 grams) in DI water (210 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The 4-methyl-2-pentanone was removed using a rotary evaporator, yielding $C_9F_{19}CH_2OC_2H_4OH/N100$ urethane.

EXAMPLE C17

Preparation of MeFOSE/N100 Urethane

A 500 mL round bottom flask equipped with a magnetic stirrer and fitted with a condenser was charged with MeFOSE (74.0 grams), MIBK (100.0 grams) and N100 (25.5 grams). Upon dissolution, the mixture was heated to reflux, DBTDL (0.02 grams) was added, and heating was continued for one hour. The solution was cooled, and yielded MeFOSE/N100 Urethane.

EXAMPLE C18

Preparation of $C_8F_{17}C_2H_4OH/N100$ Urethane

A round bottom flask equipped with a magnetic stirrer and fitted with a condenser was charged with $C_8F_{17}C_2H_4OH$ (15.0 grams), MIBK (15.4 grams) and N100 (5.1 grams). Upon dissolution, the mixture was heated to reflux, DBTDL (0.003 grams) was added, and heating was continued for one hour. The solution was cooled, and yielded $C_8F_{17}C_2H_4OH/$N100 Urethane.

EXAMPLE C19

Preparation of MeFOSE/N3300 Urethane

A 500 mL round bottom flask equipped with a magnetic stirrer and fitted with a condenser was charged with MeFOSE (74.0 grams), MIBK (100.0 grams) and N3300 (25.9 grams). Upon dissolution, the mixture was heated to reflux, DBTDL (0.02 grams) was added, and heating was continued for one hour. The solution was cooled, and yielded MeFOSE/N3300 Urethane. A solution of Witconate DS-10 (5 grams) in DI water (400 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The solvent was removed using a rotary evaporator.

TABLE 2

| Example | n* | Adv Water | Rec Water | Adv Hexadecane | Rec Hexadecane |
|---|---|---|---|---|---|
| C1 | 3 | 88 | 37 | 57 | 15 |
| 1 | 4 | 122 | 49 | 79 | 77 |

TABLE 2-continued

| Example | n* | Adv Water | Rec Water | Adv Hexadecane | Rec Hexadecane |
|---|---|---|---|---|---|
| C2 | 4 | 107 | 44 | 72 | 25 |
| 2 | 4 | 123 | 43 | 79 | 74 |
| 3 | 4 | 124 | 54 | 81 | 73 |
| 4 | 4 | 124 | 61 | 80 | 76 |
| 5 | 4 | 123 | 47 | 79 | 74 |
| C3 | 5 | 114 | 50 | 80 | 35 |
| C4 | 5 | 103 | 49 | 72 | 19 |
| C5 | 5 | 108 | 43 | 71 | 33 |
| C6 | 5 | 112 | 39 | 78 | 42 |
| C7 | 5 | 120 | 43 | 77 | 49 |
| C8 | 5 | 112 | 53 | 80 | 63 |
| C9 | 6 | 119 | 49 | 74 | 43 |
| C10 | 6 | 123 | 64 | 81 | 50 |
| C11 | 6 | 109 | 50 | 84 | 49 |
| 6 | 6 | 123 | 101 | 80 | 72 |
| C13 | 7 | 122 | 87 | 82 | 63 |
| C14 | 7 | 118 | 51 | 79 | 43 |
| C15 | 7 | 109 | 58 | 76 | 46 |
| C16 | 9 | 123 | 85 | 83 | 76 |
| C17 | 8 | 123 | 95 | 81 | 76 |
| C18 | 8 | 122 | 89 | 82 | 68 |
| C19 | 8 | 124 | 105 | 81 | 77 |
| 7 | 4 | 122 | 47 | 79 | 73 |

*n = Number of carbon atoms in $R_f$ group

TABLE 3

| Example | % solids | % F | OR | WR | $K_{ada}$ | DR | Avg F | ΔΔE |
|---|---|---|---|---|---|---|---|---|
| C19 | 25.0 | 38.6 | 3 | 3 | 0.9 | 1.1 | 296 | 0 |
| 1 | 11.9 | 31.0 | 2 | 2 | 0.9 | 2.4 | 294 | 0.96 |
| 4 | 22.5 | 31.0 | 4 | 3 | 1.6 | 2.1 | 297 | 0.87 |
| 4 | 12.0 | 31.0 | 4 | 2 | 2.3 | 1.8 | 336 | 0.46 |

The invention claimed is:

1. A urethane composition consisting essentially of the reaction product of:
   a. An aliphatic polyisocyanate having three or more isocyanate groups; and
   b. A fluorochemical of the formula $R_f$—$SO_2N(R^1)$—$R^2$-Z;
   wherein $R_f$ a perfluoroalkyl or perfluoroheteroalkyl group having from 3 to about 6 carbon atoms,
   $R^1$ is a lower alkyl group,
   $R^2$ is an alkylene or heteroalkylene group, and
   Z is an isocyanate-reactive functional group, and
   c. an aliphatic monofunctional compound, wherein said fluorochemical is in an amount sufficient to react with at least about 50% of the available isocyanate groups.

2. The composition of claim 1 wherein said aliphatic monofunctional compound is of the formula R'''-Z, wherein R''' is an aliphatic group and Z is an isocyanate-reactive functional group.

3. The composition of claim 2 comprising compounds of the formula $(R_f^*)_n A(NHCO-Z'R''')_{m-n}$ wherein $R_f^*$ is $R_f$—$SO_2N(R^1)$—$R^2$-Z',
Z' is the residue of Z,
A is the residue of said aliphatic isocyanate, having valency m,
R''' is an aliphatic radical, and
n (average) is at least 1.5.

4. The composition of claim 1 wherein
$R_f$ a fluorinated carbon chain having from 3 to about 6 carbon atoms,
$R^1$ is a —H or —$CH_3$,
$R^2$ is an alkylene group having 1 to 3 carbon atoms, and
Z is —OH.

5. The composition of claim 2 wherein the amount of aliphatic monofunctional compound is in an amount sufficient to react with the remaining available isocyanate groups.

6. The composition of claim 2 wherein the amount of aliphatic monofunctional compound is in an amount sufficient to react with 15% or less of the available isocyanate groups.

7. The composition of claim 1 wherein the amount of fluorochemical is in an amount sufficient to react with 75% or more of the available isocyanate groups.

8. The composition of claim 1 wherein $R_f$ is a perfluorinated alkyl group.

9. The composition of claim 1 further comprising a hydrophilic anti-staining compound.

10. The fibrous substrate treatment composition comprising the urethane composition of claim 1 and a solvent.

11. The treatment composition of claim 10 comprising from about 0.05 to 10 weight percent of the urethane composition.

12. A method for imparting stain-release characteristics to a fibrous substrate comprising the steps of:
   (a) applying a treatment composition of claim 11, and.
   (b) allowing the treatment composition to cure.

13. The method of claim 12 wherein said treatment composition is applied in an amount sufficient to provide between 0.05% and 3% solids on fiber.

14. The method of claim 13 wherein said composition is cured at ambient temperature.

15. An article comprising:
   a fibrous substrate having a cured coating derived from at least one solvent and a
   chemical composition of claim 1.

16. The composition of claim 1 further comprising a surfactant.

* * * * *

UNITED STATES PATENT AND TRADEMARK OFFICE
CERTIFICATE OF CORRECTION

PATENT NO. : 7,056,846 B2
APPLICATION NO. : 10/004847
DATED : June 6, 2006
INVENTOR(S) : John C. Clark It is certified that error appears in the above-identified patent and that said Letters Patent is hereby corrected as shown below:

Col. 3
Line 39, delete "27" and insert -- 27, --, therefor.

Cols. 7–8 (Table)
Line 5, delete "NH2," and insert -- NH$_2$, --, therefor.

Col. 11
Line 10, delete "Nos." and insert -- No. --, therefor.
Lines 11–12, delete "et at.)," and insert -- et al.), --, therefor.

Cols. 11–12 (Table 1)
Line 24, delete "C$_6$F$_{13}$SO$_2$N(CH3)C$_2$H$_4$OH" and insert
-- C$_6$F$_{13}$SO$_2$N(CH$_3$)C$_2$H$_4$OH --, therefor.
Line 34, delete "methylaminoethamol" and insert
-- methylaminoethanol --, therefor.

Col. 16
Line 60, after "= ppm" delete "F" and insert -- F⁻ --, therefor.

Col. 17
Line 23, delete "nitrogen" and insert -- nitrogen. --, therefor.
Line 52, delete "C$_6$F$_{13}$SO$_2$N(CH3)C$_2$H$_4$OH" and insert
-- C$_6$F$_{13}$SO$_2$N(CH$_3$)C$_2$H$_4$OH --, therefor.
Line 54, delete "C$_6$F$_{13}$SO$_2$N(CH3)C$_2$H$_4$OH" and insert
-- C$_6$F$_{13}$SO$_2$N(CH$_3$)C$_2$H$_4$OH --, therefor.
Line 67, delete "(CH3)C$_2$H$_4$OH" and insert -- (CH$_3$)C$_2$H$_4$OH --, therefor.
Line 67, after "Urethane" insert -- . --.

Col. 19
Line 29, delete "C5F11CH2OH" and insert -- C$_5$F$_{11}$CH$_2$OH --, therefor.
Line 54, after "Urethane" insert -- . --.
Line 67, after "Urethane" insert -- . --.

UNITED STATES PATENT AND TRADEMARK OFFICE
CERTIFICATE OF CORRECTION

PATENT NO. : 7,056,846 B2
APPLICATION NO. : 10/004847
DATED : June 6, 2006
INVENTOR(S) : John C. Clark It is certified that error appears in the above-identified patent and that said Letters Patent is hereby corrected as shown below:

Col. 20
Line 29, delete "(41.5 g" and insert -- (41.5 grams). --, therefor.
Line 41, after "Urethane" insert -- . --.

Col. 22
Line 62, delete "Table 2" and insert -- Table 4 --, therefor.

Col. 23
Line 28, delete "Table 3" and insert -- Table 5 --, therefor.

Col. 24
Line 33, in Claim 10, delete "The" and insert -- A --, therefor.
Line 40, in Claim 12, delete "and." and insert -- and --, therefor.

Signed and Sealed this

Eighteenth Day of March, 2008

JON W. DUDAS
*Director of the United States Patent and Trademark Office*